US008838499B2

(12) United States Patent  (10) Patent No.: US 8,838,499 B2
Del Bene et al.  (45) Date of Patent: Sep. 16, 2014

(54) METHODS AND SYSTEMS FOR LIFE STAGE MODELING

(75) Inventors: Marc Del Bene, Darien, CT (US); Marianne Iannace, North Salem, NY (US); Anant Nambiar, Larchmont, NY (US); Trina Reuben-Williams, Danbury, CT (US)

(73) Assignee: MasterCard International Incorporated, Purchase, NY (US)

( * ) Notice: Subject to any disclaimer, the term of this patent is extended or adjusted under 35 U.S.C. 154(b) by 781 days.

(21) Appl. No.: 12/323,753

(22) Filed: Nov. 26, 2008

(65) Prior Publication Data

US 2009/0192875 A1 Jul. 30, 2009

Related U.S. Application Data

(60) Provisional application No. 61/024,713, filed on Jan. 30, 2008.

(51) Int. Cl.
*G06Q 90/00* (2006.01)
*G06Q 20/40* (2012.01)
*G06Q 20/12* (2012.01)
*G06Q 20/24* (2012.01)
*G06Q 20/10* (2012.01)
*G06Q 30/02* (2012.01)
*G06Q 40/02* (2012.01)

(52) U.S. Cl.
CPC .............. *G06Q 40/02* (2013.01); *G06Q 20/405* (2013.01); *G06Q 20/12* (2013.01); *G06Q 20/24* (2013.01); *G06Q 20/10* (2013.01); *G06Q 30/02* (2013.01)
USPC ........................................................ 705/39

(58) Field of Classification Search
CPC ...................................................... G06Q 90/00
See application file for complete search history.

(56) References Cited

U.S. PATENT DOCUMENTS

| 6,055,513 | A  | * | 4/2000  | Katz et al. ................. 705/26.41 |
| 6,327,574 | B1 | * | 12/2001 | Kramer et al. ............. 705/14.66 |
| 6,592,030 | B1 |   | 7/2003  | Hardesty |
| 6,735,572 | B2 | * | 5/2004  | Landesmann .............. 705/14.39 |
| 6,793,131 | B2 |   | 9/2004  | Hogan |

(Continued)

OTHER PUBLICATIONS

The International Search Report and The Written Opinion of the International Searching Authority dated Mar. 23, 2009; Application No. PCT/US2009/032021 (11 pages).

(Continued)

*Primary Examiner* — Bruce I Ebersman
(74) *Attorney, Agent, or Firm* — Armstrong Teasdale LLP (57) ABSTRACT

A method for associating transaction card accounts with life stage segments is described. The method includes analyzing survey results to define the plurality of life stage segments based on at least one of demographics, transaction categories, and card usage. The method further includes creating at least one spending profile for a life stage target group that includes transaction card holders within at least one of the defined life stages for which a marketing campaign is targeted, developing a survey-based life stage model based on the target group and the profiles, creating a transaction data-based life stage model by applying the survey-based life stage model to a portion of the transaction data, applying the transaction-based life stage model to the transaction data to identifies cardholder accounts included within the life stage target group, and ranking the transaction card accounts stored within the database based on a likelihood the accounts are included within the target group.

18 Claims, 6 Drawing Sheets

(56) References Cited

U.S. PATENT DOCUMENTS

| | | | |
|---|---|---|---|
| 7,299,241 B2 | 11/2007 | Reed et al. | |
| 7,337,172 B2 | 2/2008 | Shapiro | |
| 7,386,485 B1* | 6/2008 | Mussman et al. | 705/14.1 |
| 7,720,743 B1* | 5/2010 | Marks | 705/37 |
| 7,844,489 B2* | 11/2010 | Landesmann | 705/14.1 |
| 2002/0087409 A1 | 7/2002 | Joao | |
| 2003/0187768 A1 | 10/2003 | Ryan et al. | |
| 2005/0240477 A1 | 10/2005 | Friday et al. | |
| 2006/0004622 A1* | 1/2006 | Fanelli et al. | 705/10 |
| 2006/0053056 A1* | 3/2006 | Alspach-Goss et al. | 705/14 |
| 2006/0259364 A1 | 11/2006 | Strock et al. | |
| 2008/0033816 A1* | 2/2008 | Miller et al. | 705/14 |
| 2008/0033857 A1 | 2/2008 | Moses | |
| 2008/0091508 A1 | 4/2008 | Rane et al. | |
| 2008/0262920 A1* | 10/2008 | O'Neill et al. | 705/14 |
| 2008/0319855 A1* | 12/2008 | Stivoric et al. | 705/14 |
| 2009/0006156 A1* | 1/2009 | Hunt et al. | 705/7 |
| 2009/0018996 A1* | 1/2009 | Hunt et al. | 707/2 |
| 2009/0132347 A1* | 5/2009 | Anderson et al. | 705/10 |
| 2009/0144201 A1 | 6/2009 | Gierkink et al. | |
| 2010/0049538 A1* | 2/2010 | Frazer et al. | 705/1 |

OTHER PUBLICATIONS

Final Office Action for U.S. Appl. No. 12/323,795 mailed Jul. 11, 2011, 29 pages.

Supplementary European Search Report dated Sep. 24, 2012, EP App. No. 09706386.1, (9 Pages).

* cited by examiner

METHODS AND SYSTEMS FOR LIFE STAGE MODELING

CROSS REFERENCE TO RELATED APPLICATIONS

This application claims the priority of Provisional Patent Application Ser. No. 61/024,713, filed Jan. 30, 2008, which is hereby incorporated by reference in its entirety.

BACKGROUND OF THE INVENTION

The field of the invention relates generally to the offering of financial products to customers, and more specifically to methods and systems for life stage modeling.

A life stage segment is a group of consumers who are classified based on shared demographics and/or certain differentiating spending behaviors. Banks often have dozens, if not hundreds, of payment cards and financial transaction cards and other financial products designed to meet the needs of their consumers at various stages in their life. A couple of examples include student transaction cards and loans, banking products designed for young families, and retirement products for older customers. Generally, each of these consumer groups are at different life stages and therefore have differentiating spending behaviors.

However, a lack of detailed consumer information coupled with an inability of these banks to share consumer data across departments makes it difficult to match various life stage based financial products with the correct consumers. At least one result is that the banks waste resources on poorly targeted promotional campaigns. Further, consumers get inundated with irrelevant offers that do not match their needs or preferences, often to the point that they will ignore offers that are relevant to their financial needs.

Banks would like to focus their services and desire to market those services more effectively than currently utilized marketing methods. In addition, it is desired that the services, and the marketing of such services, be accomplished without continuously gathering, storing and updating consumer data. With such a system, the customers receive information and offers for products that are more relevant and useful to them. In such a system, banks identify a consumer's propensity to be in a given life stage using only the information from consumer transactions on their payment card, for example, credit cards and debit cards.

BRIEF DESCRIPTION OF THE INVENTION

In one aspect, a computer-based method for associating transaction card accounts with at least one of a plurality of life stage segments is provided. The method includes storing transaction data for the transaction card accounts within a database, including data relating to each cardholder associated with a transaction card account and purchases made by the cardholders using the corresponding transaction card, analyzing survey results received from a plurality of transaction card holders to define the plurality of life stage segments based on at least one of demographics, transactions within various categories, and transaction card usage, creating at least one spending profile for a life stage target group, the life stage target group including transaction card holders within at least one of the defined life stages for which a marketing campaign is targeted, developing a survey-based life stage model based on the life stage target group and the spending profiles, creating a transaction data-based life stage model by applying the survey-based life stage model to a portion of the transaction data stored within the database, applying the transaction-based life stage model to the transaction data to identifies cardholder accounts included within the life stage target group, and ranking the transaction card accounts stored within the database based on a likelihood the accounts are included within the life stage target group.

In another aspect, a system configured to integrate survey information and credit card transaction data to determine at least one demographic group associated with a holder of a financial transaction card is provided. The system includes at least one processing device that is programmed to define a plurality of life stage segments based on received survey data, identify, from the received survey data, data that can be used as common variables between the received survey data and a database of financial transaction card transaction data, create and utilize logistic regression models that incorporate the received survey data, the financial transaction card transaction data, and the identified common variables to identify life stage segments for a plurality of financial transaction card holders, and verify a correlation between the financial transaction card usage and the identified life stage segment for at least one of the financial transaction card holders In still another aspect, a computer-based method for integrating survey information with credit card transaction data to identify transaction cardholders that are in a specific life stage segment is provided. The method includes utilizing survey results received from a plurality of financial transaction card holders to define a plurality of life stage segments, identifying survey result data that can be utilized as common variables between the survey results and a database of financial transaction card transaction data, defining spending profiles for at least one of the defined life stages, based on the common variables, creating a transaction data-based life stage model through application of the defined spending profiles to at least a portion of the database of financial transaction card transaction data, and utilizing the transaction data-based life stage model to predict a probability that a cardholder associated with the financial transaction card transaction data is within one of the defined life stages.

DETAILED DESCRIPTION OF THE INVENTION

The life stage modeling systems and methods described herein are based on consumer research that profiles how consumers that are in different life stages (or life stage segments) utilize their payment (e.g., financial transaction) cards. The data from the research is used to create spending profiles that are associated with each life stage. These profiles are then leveraged to develop data models that sift through transaction data and sort consumers into life stages based on how they have used their payment cards.

More specifically, the systems and processes described herein facilitate, for example, determination of a customer's propensity to be in a given life stage using a client system, automated extraction of information, and web-based reporting for internal and external system users. A technical effect of the systems and processes described herein include at least one of (a) defining one or more life stage segments using survey results received from a subset of customers that have an account related to a financial transaction card, (b) identifying self reported spending information in the survey results that can be used as a common variable between the survey results and a database of transactions related to the financial transaction card, (c) using a processing device to create and use a logistic regression model to link consumers to one or more of the defined life stage segments based on the database of transactions, (d) creating a behavioral model, based on transaction data, that predicts the probability that a consumer account is associated with a customer in a specific life stage segment, and (e) development of a process to apply the behavioral model for example, in the marketing of financial products.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

Figure 1:
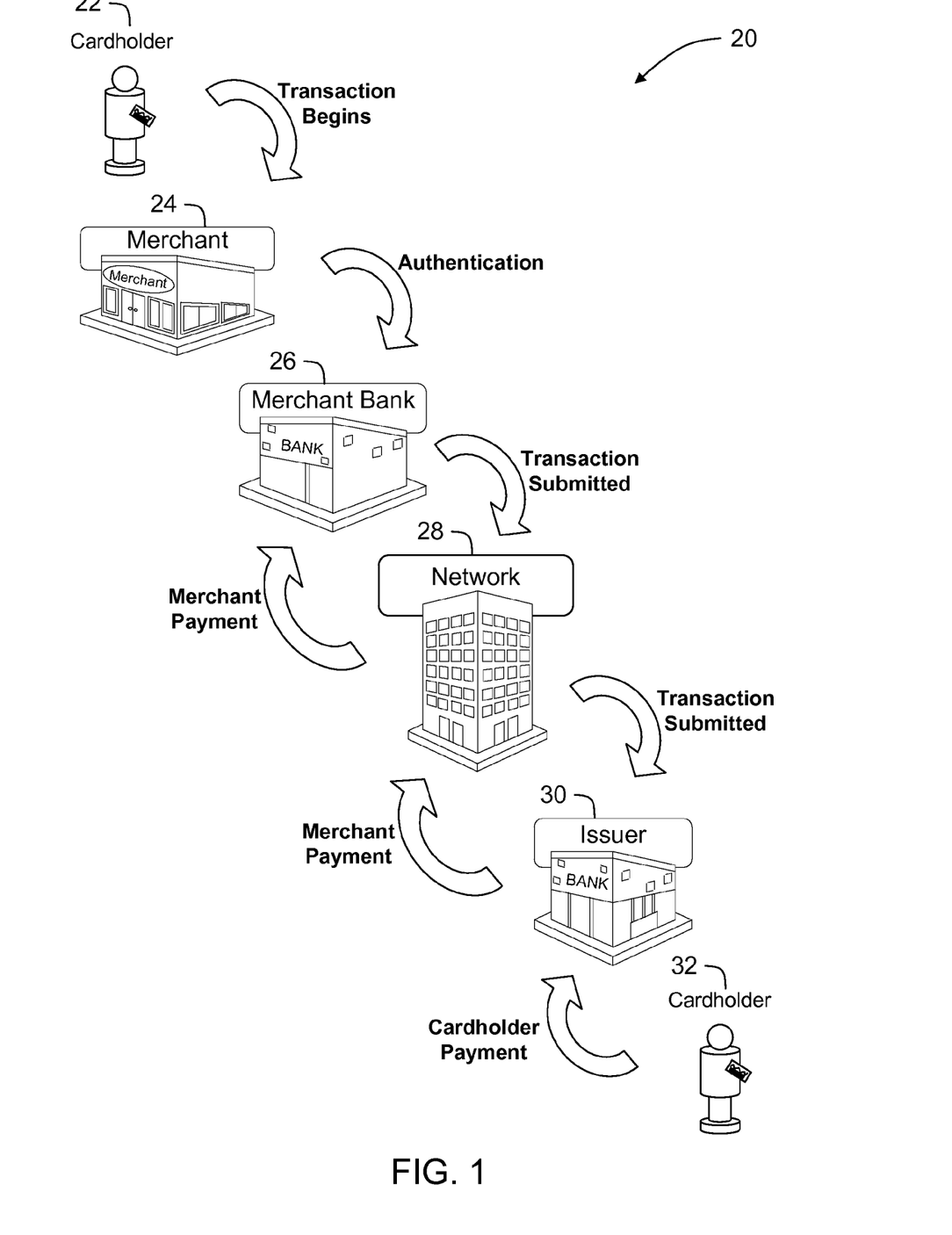
FIG. 1 is a schematic diagram illustrating an exemplary multi-party payment card industry system for enabling ordinary payment-by-card transactions in which the merchants and issuer do not need to have a one-to-one special relationship.

FIG. 1 is a schematic diagram 20 illustrating an exemplary multi-party payment card industry system for enabling ordinary payment-by-card transactions in which the merchants and issuer do not need to have a one-to-one special relationship. The present invention relates to a payment card system, such as a credit card payment system using the MasterCard® interchange network. The MasterCard® interchange network is a set proprietary communications standards promulgated by MasterCard International Incorporated® for the exchange of financial transaction data and settlement funds between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe or chip on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor" or a "third party processor."

Using the interchange network 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge for a credit transaction is not posted immediately to a consumer's account because bankcard associations, such as MasterCard International Incorporated®, have promulgated rules that do not allow a merchant to charge, or "capture," a transaction until goods are shipped or services are delivered. However, with respect to at least some debit card transactions, a charge may be posted at the time of the transaction. When a merchant ships or delivers the goods or services, the merchant captures the transaction by, for example, appropriate data entry procedures on the point-of-sale terminal. This may include bundling of approved transactions daily for standard retail purchases. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group. More specifically, a transaction is typically settled between the issuer and the interchange network, and then between the interchange network and the merchant bank (also known as the acquirer bank), and then between the merchant bank and the merchant.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
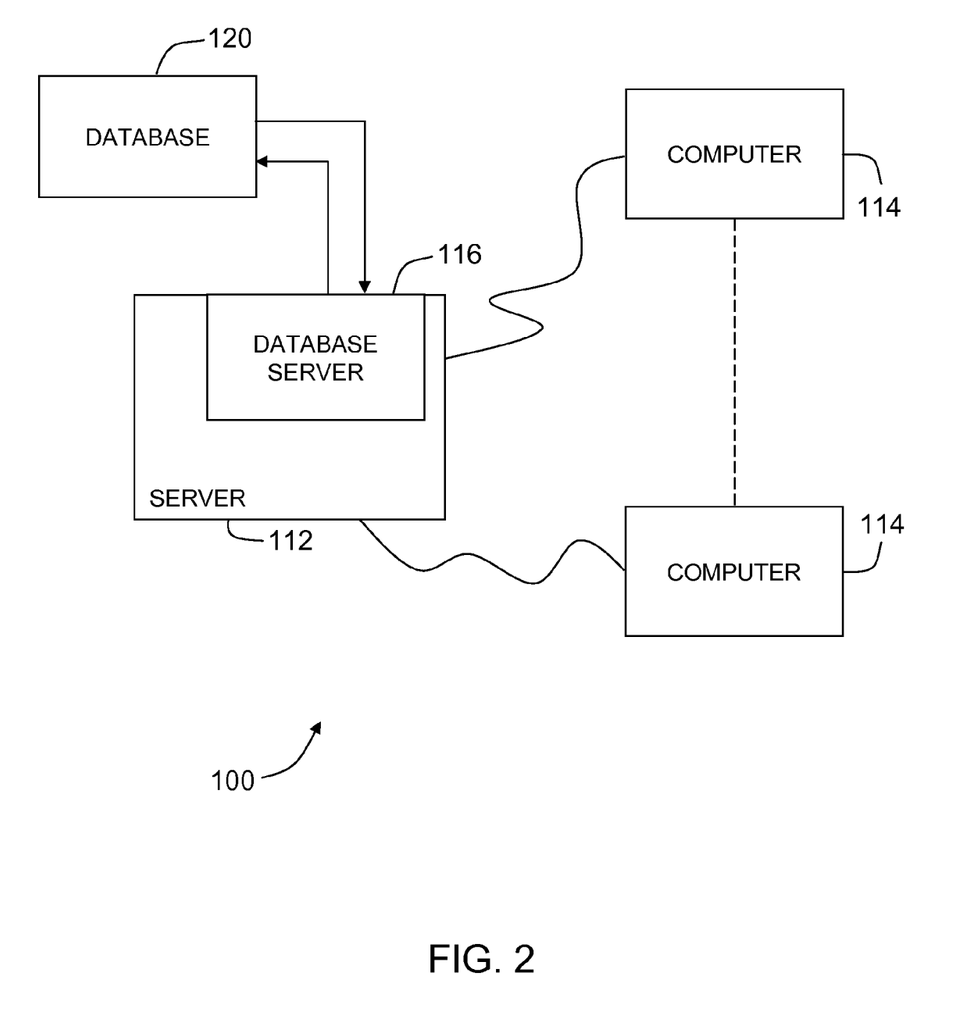
FIG. 2 is a simplified block diagram of an exemplary embodiment of a server architecture of a system in accordance with one embodiment of the present invention.

FIG. 2 is a simplified block diagram of an exemplary system 100 in accordance with one embodiment of the present invention. In one embodiment, system 100 is a payment card system used for implementing special or customized issuer-merchant relationships, and is operable to implement the modeling techniques and transaction database described herein. In addition, system 100 is operable as a payment card system, which can be utilized by users for management of accounts and payment transactions.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 stores transaction data generated as part of sales activities conducted over the bankcard network including data relating to merchants, account holders or customers, and purchases. Database 120 may also be utilized to store survey results and results of the modeling processes described herein.

Figure 3:
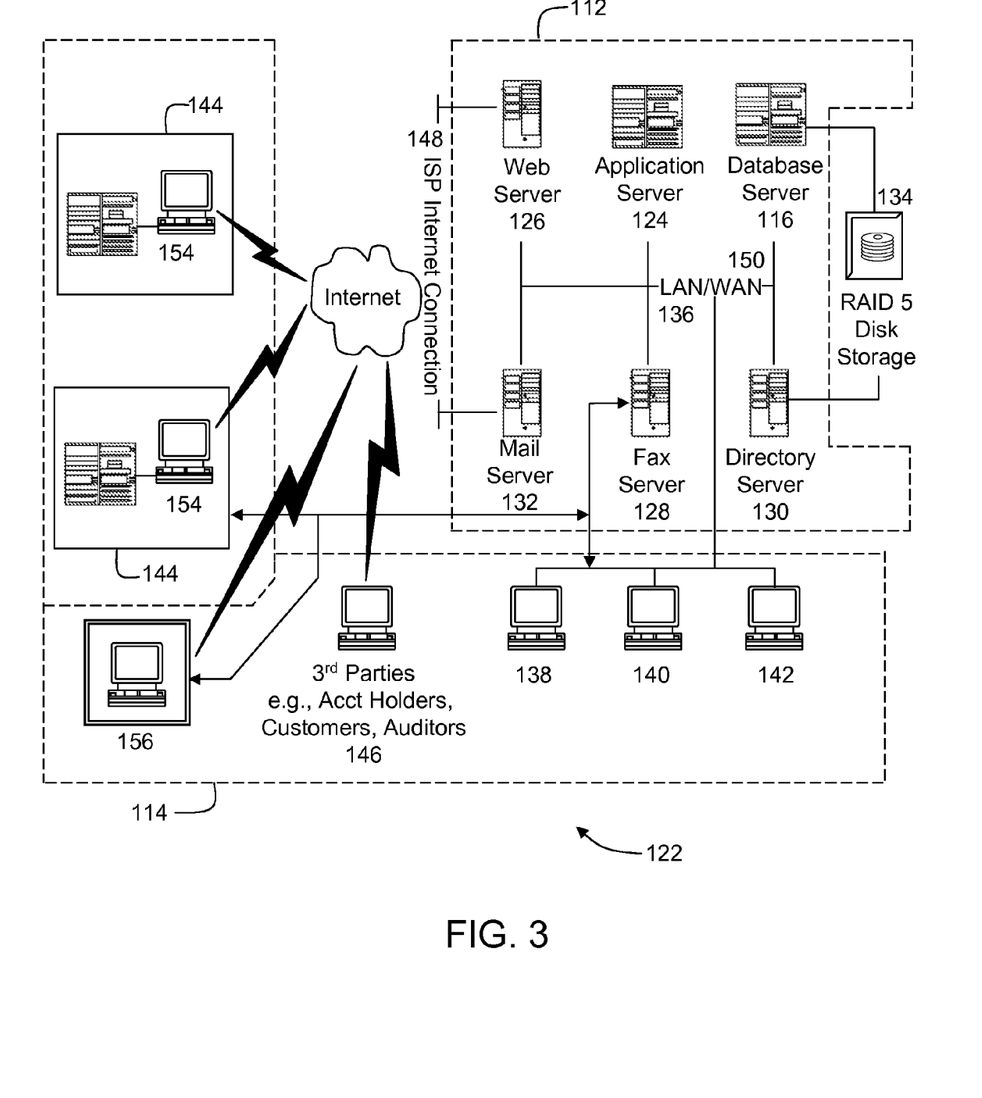
FIG. 3 is an expanded block diagram of an exemplary embodiment of a server architecture of a system in accordance with one embodiment of the present invention.

FIG. 3 is an expanded block diagram of an exemplary embodiment of a server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
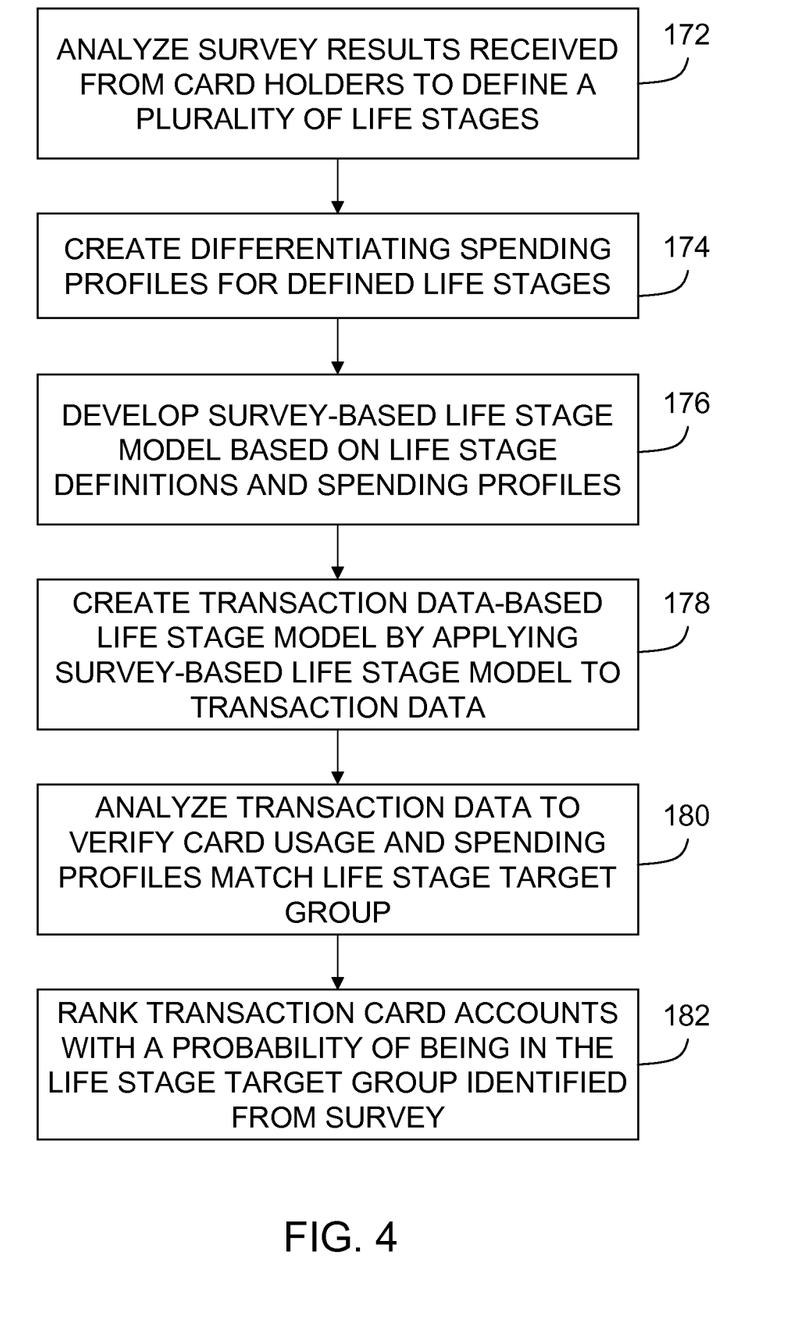
FIG. 4 is a flow chart illustrating a life stage modeling process.

FIG. 4 is a flow chart 170 illustrating a life stage modeling process. Specifically, a computer-based method for linking transaction card accounts with at least one of a plurality of life stage segments, or defined life stages, is illustrated by the flowchart 170 of FIG. 4. The method includes analyzing 172 results from surveys received from a plurality of transaction card holders. As further described, these survey results are utilized in the definition of life stage segments. The life stage segments are generally based on, for example, at least one of demographics, transactions within various categories that can be differentiated from one another, and transaction card usage. An example of a category is a merchant category, for example, a pharmacy and a sporting goods retailer. Spending profiles are created 174 based on the survey results which are then utilized in the differentiation between customers, to identify into which of the defined life stage segments they best fit.

After the life stage segments are defined, then a life stage target group can be selected, for example, by a marketing person. The life stage target group is a group of transaction card customers that fall within at least one of the defined life stages. In the example embodiment, the survey is directed to a plurality of transaction card holders. The results of the survey are intended to allow the transaction card issuer, or a third party transaction card network (or other party marketing transaction cards and their usage), to define life stage segments (i.e., different segments of society that transaction card holders are associated with). In addition, transaction card usage by each card holder responding to the survey is also utilized in defining life stage segments. In other words, a life stage target group is a group of cardholders that are included within at least one defined life stage segment and is the group of cardholders that the marketer is targeting for a marketing program or campaign.

As further described below, a survey-based life stage model is then developed 176 based on a combination of a selected life stage target group and the differentiating spending profiles mentioned above. In addition, a transaction data-based life stage model is created 178 through application of the survey-based life stage model to, for example, at least a portion of the transaction data within a transaction card transaction database. In other words, life stage segments are defined through the analyzing of survey results, which generally includes at least some data related to transactions, and the transactions that are associated with a particular life stage segment are then applied to a database of transaction data. Transactions that are in the database of transaction data that are determined to be similar to the transactions that, at least in part define a life stage segment, are then utilized to associate cardholders with the corresponding life stage segment. That is, such cardholders are determined to have a higher likelihood that they belong within the particular life stage segment.

Generally, and as part of a marketing campaign, the transaction data-based life stage model is run on the transaction data 180 to identify transaction card accounts belonging to consumers that would tend to be in the selected life stage segment (the selected life stage target group). As part of the identification process, transaction card accounts represented within the database are then ranked 182 with a probability of being in the selected life stage target group Accounts with a high probability (as defined by a user) of being in the selected life stage target group are then contacted with relevant information or offers.

Figure 5:
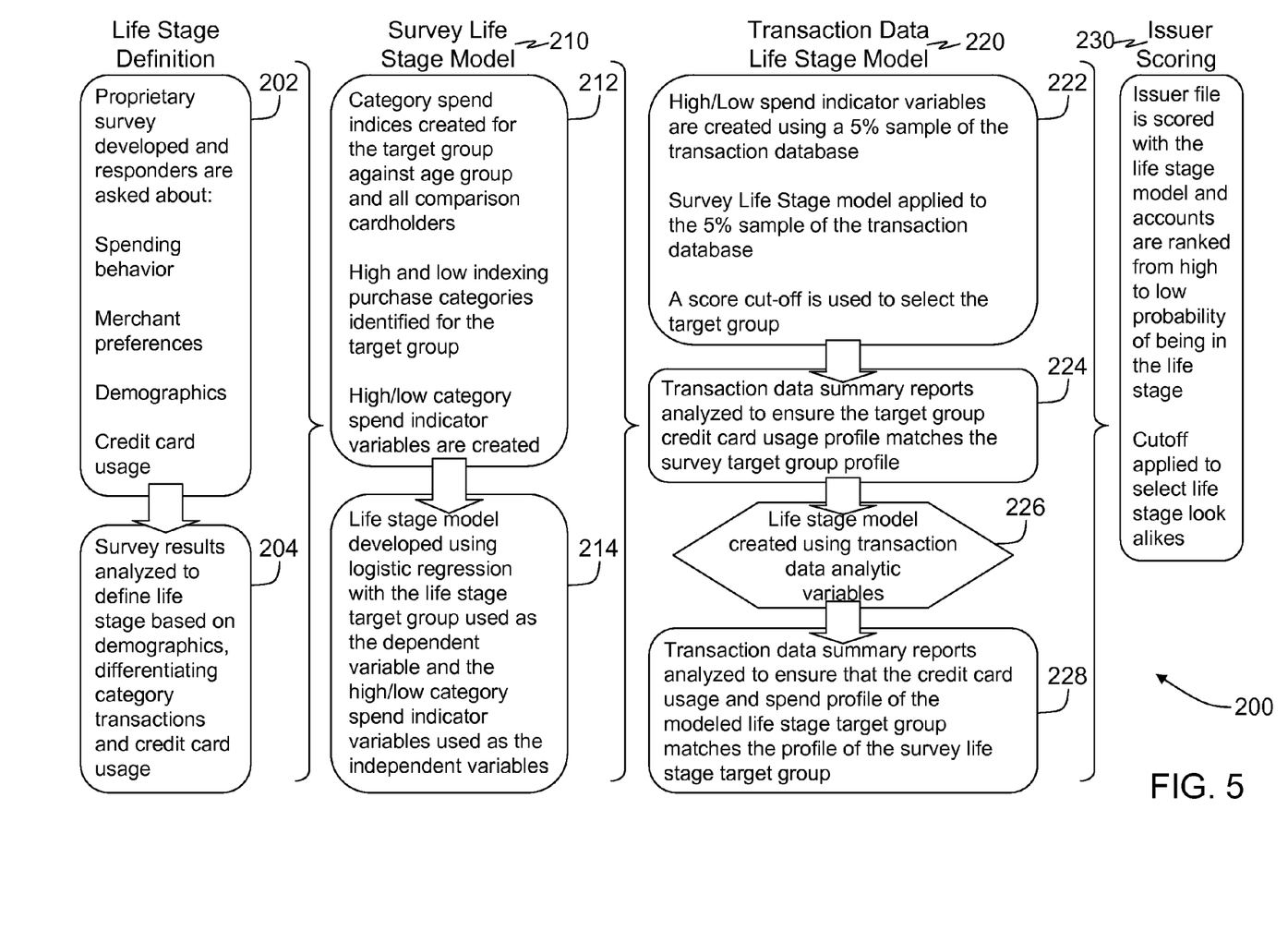
FIG. 5 is a high level process map that outlines development of life stage models.

Now referring to FIG. 5, which includes a life stage model process flow chart 200, a life stage is defined 202 to include a group of consumers who are classified together based on shared demographics and through differentiating spending behaviors. In the life stage definition phase, a proprietary survey is provided to a group of responders, and the results therefrom are used to define life stage segments, from which a life stage target group may eventually be selected.

One embodiment of the survey includes self reported answers to demographic and financial transaction card usage questions. The steps associated with this phase include analyzing of survey results 204 such as self reported spending behavior, merchant preferences, demographics, and financial transaction card usage, some of which may be based on appended third party demographic data. Behaviors which may be utilized to define a desired marketing opportunity to a life stage target group, such as transactions that occur within different categories, are identified through the self reported survey responses. Responders who share the desired spend behaviors are indexed against comparison groups which include a larger universe of financial transaction card users. The index is created by calculating the spending propensities of survey responders that are determined to be in a life stage target group, and those cardholders from the larger universe that exhibit similar spending characteristics. Specifically, the index illustrates high spending propensities (purchases were made in a specific merchant category (e.g., pharmacy, sporting goods) nine or more times) and low spending propensities (no purchases in the specific merchant category) for each merchant category. Table 1 below shows one sample list of merchant categories.

In one embodiment, an index score is calculated as (% of life stage target)/(% of comparison group)×100. In the embodiment, the target group is refined through an iterative process until a differentiating pattern of high (e.g., an index of 115 or above) and low (e.g., an index score of 85 or below) merchant category index scores is obtained. All responders meeting the target group criteria (the 115 or above index for example) are assigned a "1". All other responders are assigned a "0".

A survey life stage model 210 is defined by creating a model which identifies differentiating category spend patterns. Inputs 212 to model 210 include category spend indices that are created for an identified, or to be identified, life stage target group, These spend indices are compared against transaction data for the remainder of the transaction card holders. Additionally, high and low indexing purchase categories are identified for the life stage target group, and both high and low category spend variables are created within the model 210.

In one embodiment, model 210 is created in part by determining a high spend propensity. This high spend propensity is based on a percentage of survey responders who answered they made a purchase in a given merchant category nine or more times for the life stage target group and for example, comparison age groups. As described above, high spend propensity variables are created in this embodiment by assigning a "1" to all accounts indicating making nine or more transactions over a twelve month period in one or more related merchant categories. All other responders are assigned a "0".

A low spend propensity is determined based on the percentage of responders who answered they purchased zero times or "Never" over a twelve month period. Low spend propensity variables are created by assigning a "1" to all accounts which indicated not having made a purchase in each aggregated merchant. All other responders are assigned a "0". Next, an algorithm is created using logistic regression. The life stage target group, which is generally a user selected one of the life stage segments from the life stage definition 202 is used as dependent variables of the algorithm. The high and low spend propensity variables are used as independent variables of the algorithm.

In one embodiment, the survey-based life stage model 210 is developed 214 using logistic regression with the life stage target group used as the dependent variable and high/low category spending propensity variables are used as independent variables for the model 210.

In a transaction data life stage model 220, a sample of accounts contained within an analytic area are identified and a report of summarized prior spend and transaction activity, for example over a twelve month period, is created. Key statistics, which include the mean/average, median, minimum, maximum, and a spending distribution by merchant category are analyzed to identify cut-offs for high and low spend indicator variables.

For input 222 into model 220, high and low spend indicator variables are created based on a five percent sample of the transaction database, and the survey-based life stage model 210 is applied to the five percent sample of the transaction database, and a cut-off value is utilized to select a life stage target group. Transaction data summary reports are analyzed 224 to ensure the target group credit card profile matches the survey target group profile. The transaction-based life stage model 220 is created 226 using one or more analytic variables within the transaction data, and transaction data summary reports are analyzed 228 to ensure that the financial transaction card usage and spend profile of the modeled life stage target group matches the profile of the life stage target group.

In one embodiment, high spend propensity variables are created by assigning a "1" to all accounts scoring higher than a mean spend amount for a specific merchant category. Such propensity variables also correspond to a number of transactions in a merchant category that place the account in a comparable percentile range as responders who indicated high spend on the survey. All other accounts are assigned a "0". Low spend propensity variables are created by assigning a "1" to all accounts which score below the mean spend value for each merchant category and who also have made a number of transactions in the category that would place them in a comparable percentile range as those responders who indicated low spend on the survey. All other accounts are assigned a "0".

These spending propensity variables, sometimes referred to as indicator variables, are utilized as inputs to generate a target score obtained from applying the survey-based life stage target group algorithm from the survey life stage model 210 to a universe of demographically profiled accounts. The top scoring accounts, for example the top quartile, are used as the life stage target group. Reports are generated by merchant categories, which include category spend averages, purchase clusters, and merchant spend activity. The reports are then evaluated to ensure that the target group was appropriately assigned and that the selected modeled group has a consistent pattern of spend and purchase cluster profiles with the identified life stage target group from the survey. Purchase clusters, as utilized herein, refer to actionable, demographic profiles into which cardholders are grouped. Purchase clusters basically show a customer's propensity for specific products and services (e.g. a propensity to buy from certain merchant categories).

The identified target group in the previous step is then used as a dependent variable in a model which uses transaction data to rank and score life stage target group look-a-likes from a specified issuer universe. The issuer universe is enhanced with demographic data which is used to filter the eligible accounts for inclusion in the final model calibration data set.

The transaction data-based life stage model 220 is a predictive model that is created, in one embodiment, as described in the following paragraphs.

In regard to predictive modeling, such a model is developed to predict an "effect", and typically involves identification of factors that significantly impact the effect being studied (root causes and/or symptoms), as well as the manner or "direction" in which such factors have an impact (positive or negative) on the direction and the extent or "weight" of impact of these factors. A robust model typically demonstrates stability in the direction of impact and weights of the significant factors. Usage of "development" and "validation" samples facilitates assessment of model stability. A predictive model is deployed as a "score" derived from the factor values and weights. The score helps "rank-order" a given population based on the expected "probability" or "level" of the effect.

One embodiment of the life stage model 220 described herein is based on summarized information which includes dollars spent over the prior twelve months in merchant categories, which may be aggregated for particular merchants, the number of transactions in the prior twelve months in merchant categories, purchase cluster membership, and velocity variables. In the embodiment, the transaction data-based life stage model 220 is developed using a 50/50 sample/validation split. Model development is undertaken on a 50% random sample of the data available after applying suppressions, and the remaining 50% of the data is used as a "validation" sample. To measure performance of model 220, the validation samples are divided into deciles based on score values.

With regard to a structure of model 220, the logistic regression model is built upon the dependent target group variable and assessed across separate dependent components, for example, probability model: logistic model P(Target=1).

Candidate predictor variables are also utilized within model 220. Specifically, account data relating to the financial transaction card is collected for the previous 12 month period and candidate variables are created. Examples of these candidate variables include, velocity variables for the past quarter, half-year, and year, purchase clusters, first and last dates of transactions, historical transactions (12 months), historical spend (12 months), transaction by aggregated merchant and/or category, and spend by aggregated merchant and/or category.

In a variable reduction process, candidate variables are screened and selected for model inclusion through the use of Exploratory Data Analysis (EDA). These include categorical variables such as frequency distributions and cross-tab vs. dependent variables, numeric variables such as univariate statistics, binned graphs vs. dependent variable, and further variable transformations based upon EDA of categorical and numeric variables. Variable screening and reduction candidate variables are also included such as variable clusters that are created where the strongest variable from each variable cluster is selected for model stability. An initial stepwise logistic regression is created and a further check for multi-collinearity is performed.

The model performance statistics in the following list show a high concordance, that is, an ability to accurately rank order the population, high values of Somer's D (percent concordant), Gamma (percent disconcordant), Tau-a (percent tied), and c (pairs) all denote high concordance and ranges from 0.5 to 1, where 0.5 corresponds to the model randomly predicting the response, and a 1 corresponds to the model perfectly discriminating the response. In regard to concordance and discordance, a pair is concordant if the observation with the larger value of predicted probability also has the larger value of actual response and discordant if vice-versa. A KS Statistic by decile rank is also used to assess model strength.

Model performance evaluation involves dividing the population into sub-groups (typically into deciles based on predicted score values), comparing the impact of targeting groups based on "predicted scores" vs. "no model" in capturing "actual" effect within the targeted group, for example, model lift, and comparing "actual" behavior across groups—to assess if groups with higher "predicted" scores demonstrate higher levels of the "actual" effect.

In issuer scoring 230, the transaction data-based life stage model 220 is applied to an issuer file. The selected accounts represent the highest scoring life stage model look-alikes. The steps are as follows: the life stage algorithm created for the life stage model 220 is applied to an issuer file of accounts which includes summarized information for the prior months of spending activity and all associated variables including purchase clusters and velocity variables. Accounts are scored and ranked, and a cut-off score is applied to select the top scoring life stage look-a-likes.

Figure 6:
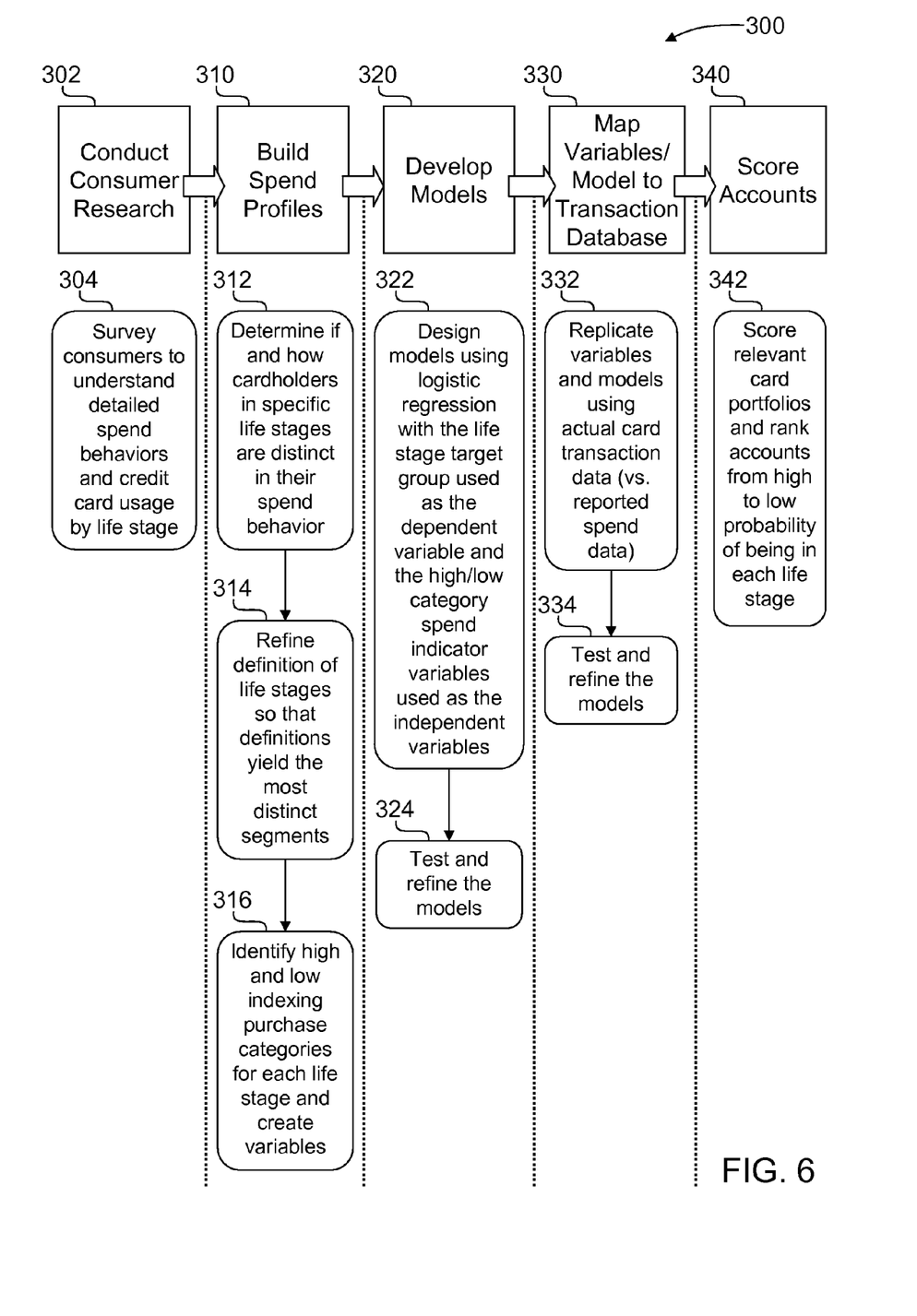
FIG. 6 is a diagram of an exemplary embodiment of a system according to the present invention.

FIG. 6 is a chart 300 providing a further illustration of the development of the life stage model described above. Referring to chart 300, customer research is conducted 302 in which customers are surveyed 304 to understand detailed spending behaviors and credit card usage by life stage.

To build 310 spending profiles, it is determined 312 if and how cardholders in specific life stages are distinct in their spending behavior. Definitions of life stages are refined 314 so that definitions yield the most distinct life stage segments. High and low indexing purchase categories are identified 316 for each life stage and variables are created.

Models are developed 320. More specifically, models are designed 322 using logistic regression with the life stage target group used as the dependent variable and the high/low category spend indicator variables used as the independent variables. The designed 322 models are then tested 324 and refined, if necessary. Variables are then mapped 330 from the model to a database of financial transaction card transactions. Variables and models are replicated 332 using actual financial transaction card data (as opposed to reported spending data from the customer survey). The models are once again tested 334 and refined if necessary.

Accounts are then scored 340. More specifically, relevant card portfolios are scored 342 and accounts ranked from a high probability to a low probability of being in one of the defined life stages.

While the invention has been described in terms of various specific embodiments, those skilled in the art will recognize that the invention can be practiced with modification within the spirit and scope of the claims.

TABLE 1

Aggregated Merchant Categories

| INDUSTRY | INDUSTRY NAME |
| --- | --- |
| AAC | Children's Apparel |
| AAF | Family Apparel |
| AAM | Men's Apparel |
| AAW | Women's Apparel |
| AAX | Miscellaneous Apparel |
| ACC | Accommodations |
| ACS | Automotive New and Used Car Sales |
| ADV | Advertising Services |

TABLE 1-continued

Aggregated Merchant Categories

| INDUSTRY | INDUSTRY NAME |
|---|---|
| AFH | Agriculture/Forestry/Fishing/Hunting |
| AFS | Automotive Fuel |
| ALS | Accounting and Legal Services |
| ARA | Amusement, Recreation Activities |
| ART | Arts and Crafts Stores |
| AUC | Automotive Used Only Car Sales |
| AUT | Automotive Retail |
| BKS | Book Stores |
| BMV | Music and Videos |
| BNM | Newspapers and Magazines |
| BTN | Bars/Taverns/Nightclubs |
| BWL | Beer/Wine/Liquor Stores |
| CCR | Consumer Credit Reporting |
| CEA | Consumer Electronics/Appliances |
| CES | Cleaning and Exterminating Services |
| CGA | Casino and Gambling Activities |
| CMP | Computer/Software Stores |
| CNS | Construction Services |
| COS | Cosmetics and Beauty Services |
| CPS | Camera/Photography Supplies |
| CSV | Courier Services |
| CTE | Communications, Telecommunications Equipment |
| CTS | Communications, Telecommunications, Cable Services |
| CUE | College, University Education |
| CUF | Clothing, Uniform, Costume Rental |
| DAS | Dating Services |
| DCS | Death Care Services |
| DIS | Discount Department Stores |
| DLS | Drycleaning, Laundry Services |
| DPT | Department Stores |
| DSC | Drug Store Chains |
| DVG | Variety/General Merchandise Stores |
| EAP | Eating Places |
| ECA | Employment, Consulting Agencies |
| EHS | Elementary, Middle, High Schools |
| EQR | Equipment Rental |
| ETC | Miscellaneous |
| FLO | Florists |
| FSV | Financial Services |
| GHC | Giftware/Houseware/Card Shops |
| GRO | Grocery Stores |
| GSF | Specialty Food Stores |
| HBM | Health/Beauty/Medical Supplies |
| HCS | Health Care and Social Assistance |
| HFF | Home Furnishings/Furniture |
| HIC | Home Improvement Centers |
| INS | Insurance |
| IRS | Information Retrieval Services |
| JGS | Jewelry and Giftware |
| LEE | Live Performances, Events, Exhibits |
| LLS | Luggage and Leather Stores |
| LMS | Landscaping/Maintenance Services |
| MAS | Miscellaneous Administrative and Waste Disposal Services |
| MER | Miscellaneous Entertainment and Recreation |
| MES | Miscellaneous Educational Services |
| MFG | Manufacturing |
| MOS | Miscellaneous Personal Services |
| MOT | Movie and Other Theatrical |
| MPI | Miscellaneous Publishing Industries |
| MPS | Miscellaneous Professional Services |
| MRS | Maintenance and Repair Services |
| MTS | Miscellaneous Technical Services |
| MVS | Miscellaneous Vehicle Sales |
| OPT | Optical |
| OSC | Office Supply Chains |
| PCS | Pet Care Services |
| PET | Pet Stores |
| PFS | Photofinishing Services |
| PHS | Photography Services |
| PST | Professional Sports Teams |
| PUA | Public Administration |
| RCP | Religious, Civic and Professional Organizations |
| RES | Real Estate Services |
| SGS | Sporting Goods/Apparel/Footwear |

TABLE 1-continued

Aggregated Merchant Categories

| INDUSTRY | INDUSTRY NAME |
|---|---|
| SHS | Shoe Stores |
| SND | Software Production, Network Service and Data Processing |
| SSS | Security, Surveillance Services |
| TAT | Travel Agencies and Tour Operators |
| TEA | T + E Airlines |
| TEB | T + E Bus |
| TET | T + E Cruise Lines |
| TEV | T + E Vehicle Rental |
| TOY | Toy Stores |
| TRR | T + E Railroad |
| TSE | Training Centers, Seminars |
| TSS | Other Transportation Services |
| TTL | T + E Taxi and Limousine |
| UTL | Utilities |
| VES | Veterinary Services |
| VGR | Video and Game Rentals |
| VTB | Vocation, Trade and Business Schools |
| WAH | Warehouse |
| WHC | Wholesale Clubs |
| WHT | Wholesale Trade |

What is claimed is:

1. A computer-based method for associating transaction card accounts with at least one of a plurality of life stage segments, wherein the life of a transaction cardholder is divisible into a plurality of life stages, and wherein each of the plurality of life stage segments corresponds to one of the plurality of life stages, said method comprising:

storing transaction data for the transaction card accounts within a database including cardholder data relating to each cardholder associated with a transaction card account and purchase data associated with purchases made by the cardholders using the corresponding transaction card;

analyzing survey results, using a processing device, to identify common spending behaviors, within a plurality of predefined merchant categories, that are shared by a plurality of cardholders and to further identify spending within the plurality of predefined merchant categories that is shared by transaction cardholders within a life stage target group;

creating a merchant category index score of spending by a transaction cardholder within the life stage target group for each of the predefined plurality of merchant categories by comparing spending of the transaction cardholder against a comparison group which includes survey responders that are not within the life stage target group, wherein the merchant category index score illustrates high spending propensities or low spending propensities for each of the predefined plurality of merchant categories;

defining definitions of the plurality of life stage segments based on the identified spending behaviors and an occurrence of certain predetermined events occurring in a life of a cardholder, wherein each life stage segment includes cardholders having similar spending behaviors and similar occurrences of the predetermined events;

refining the definitions of the plurality of life stage segments, to increase the distinction between life stage segments, by identifying a high indexing purchase category and a low indexing purchase category for each life stage in an iterative process until a differentiating pattern between a high purchase category index score, associated with the high indexing purchase category, and a low purchase category index score, associated with the low indexing purchase category, is obtained;

defining a spending profile for each of the plurality of life stage segments;

selecting one of the plurality of life stage segments as a life stage target group, the life stage target group including transaction cardholders within at least one of the defined life stage segments for which a marketing campaign is targeted;

developing, using the processing device, a survey-based life stage model representing spend behaviors of transaction cardholders within the life stage target group;

creating, with the processing device, a transaction data-based life stage model by applying the survey-based life stage model to the transaction data stored within the database associated with transaction cardholders within the life stage target group;

storing transaction card purchase data from purchases made by transaction cardholders whose life stage segment is unknown;

applying, using the processing device, the transaction-based life stage model to the stored transaction card purchase data from purchases made by transaction cardholders whose life stage segment is unknown to identify transaction cardholders included within the life stage target group; and ranking, using the processing device, the transaction card accounts associated with the transaction cardholders whose life stage segment is unknown based on a likelihood the accounts are included within the life stage target group wherein the ranked transaction card accounts may be used in a marketing campaign.

2. A computer-based method according to claim 1 wherein analyzing survey results received from a plurality of transaction cardholders comprises utilizing a proprietary survey to define at least one life stage segment.

3. A computer-based method according to claim 1 further comprising analyzing survey results, from a plurality of transaction cardholders which include self-reported answers to questions relating to at least one of spending behavior, merchant preferences, demographics and transaction card utilization.

4. A computer-based method according to claim 1 wherein defining a spending profile for each of the plurality of life stage target groups comprises:

identifying, from the survey results, spending propensities that potentially define a desired marketing opportunity; and determining from the database which transaction cardholders exhibit similar spending characteristics.

5. A computer-based method according to claim 4 further comprising indexing the survey results that share a desired spend behavior against a larger group of transactions within the database.

6. A computer-based method according to claim 1 wherein creating a transaction data-based life stage model comprises:

inputting category spend indices for the life stage target group;

identifying high and low purchase category indices for the life stage target group; and creating high and low category spending variables within the survey-based life stage model.

7. A computer-based method according to claim 1 wherein creating a transaction data-based life stage model comprises:

identifying a sample of accounts contained in an analytic data mart;

creating a report of summarized prior spend and transaction activity, for a period, from the identified sample of account; and analyzing at least one of mean, average, median, minimum, maximum, and a spending distribution by merchant category within the created report to identify spending cut-offs for high and low spend indicator variables.

8. A computer-based method according to claim 7 further comprising:

creating high and low spend indicator variables using a sample of the transaction database; and applying the survey-based life stage model to the sample of the transaction database; and utilizing a cut-off score to select a modeled life stage target group.

9. A computer-based method according to claim 7 further comprising:

utilizing the indicator variables as inputs to generate a target score obtained from applying the survey-based life stage model to a plurality of demographically profiled accounts; and using a percentage of the top scoring accounts as the life stage target group.

10. A computer-based method according to claim 1 further comprising analyzing transaction data summary reports to ensure that credit card usage and spending profiles of the modeled life stage target group matches the profile of the survey-based life stage target group.

11. A computer-based method according to claim 1 wherein ranking the transaction card accounts associated with the cardholders whose life stage segment is unknown comprises:

generating reports by merchant categories; and evaluating spending activity by merchant to ensure that the life stage target group was appropriately assigned and that the selected modeled group has a consistent pattern of spend and purchase cluster profiles with the identified group from the survey.

12. A system configured to integrate survey information and credit card transaction data to associate transaction card accounts with at least one of a plurality of life stage segments, said system comprising at least one processing device programmed to:

access transaction data stored in a database for the transaction card accounts, including data relating to each cardholder associated with a transaction card account and purchases made by the cardholders using the corresponding transaction card;

analyze survey results, using a processing device, received from a plurality of transaction cardholders;

identify survey result data that can be utilized as common variables between the survey results and a database of financial transaction card transaction data to identify common spending behaviors within a plurality of predefined merchant categories that are shared by a plurality of cardholders and to further identify spending within the plurality of predefined merchant categories that is shared by transaction cardholders within a life stage target group;

create a merchant category index score of spending by a transaction cardholder within the life stage target group for each of the predefined plurality of merchant categories by comparing spending of the transaction cardholder against a comparison group which includes survey responders that are not within the life stage target group, wherein the merchant category index score illustrates high spending propensities or low spending propensities for each of the predefined plurality of merchant categories;

define definitions of the plurality of life stage segments, using the processing device, based on the identified survey result data and an occurrence of certain predetermined events occurring in a life of a cardholder, wherein each life stage segment includes cardholders having similar spending behaviors and similar occurrences of the predetermined events;

refine the definitions of the plurality of life stage segments, to increase the distinction between life stage segments, by identifying a high indexing purchase category and a low indexing purchase category for each life stage in an iterative process until a differentiating pattern between a high purchase category index score, associated with the high indexing purchase category, and a low purchase category index score, associated with the low indexing purchase category, is obtained;

define a spending profile for each of the plurality of life stage segments;

select one of the plurality of life stage segments as a life stage target group, the life stage target group including transaction cardholders within at least one of the defined life stage segments for which a marketing campaign is targeted;

develop a survey-based life stage model representing spend behaviors of transaction cardholders within the life stage target group;

create a transaction data-based life stage model by applying the survey-based life stage model to a portion of the transaction data stored within the database associated with transaction cardholders within the life stage target group;

apply the transaction-based life stage model to a portion of the transaction data stored within the database associated with transaction cardholders whose life stage segment is unknown to identify cardholder accounts included within the life stage target group; and rank the transaction card accounts stored within the database based on a likelihood the accounts are included within the life stage target group wherein the ranked transaction card accounts may be used in a marketing campaign.

13. A system according to claim 12, wherein the at least one processing device is programmed to receive self-reported credit card spending information from a plurality of financial transaction cardholders.

14. A system according to claim 12, wherein the at least one processing device is further programmed to:
identify, from the survey results, data that can be used as common variables between the survey results and the stored transaction data; and
link a life stage segment defined from the survey results with a life stage target group identified from the stored transaction data.

15. A system according to claim 14, wherein said at least one processing device is further programmed to:
create and utilize logistic regression models that incorporate the survey results, the transaction data, and the identified common variables to identify life stage segments for a plurality of transaction card accounts; and
verify a correlation between the financial transaction card usage and the identified life stage segment for at least one of the transaction card accounts.

16. A system according to claim 15, wherein the at least one processing device is programmed to assign transaction card accounts represented within the database of financial transaction card transaction data with a probability of being in a life stage segment identified using the received survey data.

17. A system according to claim 12, wherein the at least one processing device is further programmed to verify a correlation between the financial transaction card usage and the identified life stage segment, and to predict a probability that a financial transaction card account is included within a defined life stage segment.

18. One or more non-transitory computer-readable storage media having computer-executable instructions embodied thereon, wherein, when executed by at least one processor, the computer-executable instructions cause the processor to:
store transaction data for the transaction card accounts within a database including cardholder data relating to each cardholder associated with a transaction card account and purchase data associated with purchases made by the cardholders using the corresponding transaction card;

analyze survey results, using a processing device, to identify common spending behaviors, within a plurality of predefined merchant categories, that are shared by a plurality of cardholders and to further identify spending within the plurality of predefined merchant categories that is shared by transaction cardholders within a life stage target group;

create a merchant category index score of spending by a transaction cardholder within the life stage target group for each of the predefined plurality of merchant categories by comparing spending of the transaction cardholder against a comparison group which includes survey responders that are not within the life stage target group, wherein the merchant category index score illustrates high spending propensities or low spending propensities for each of the predefined plurality of merchant categories;

define definitions of the plurality of life stage segments based on the identified spending behaviors and an occurrence of certain predetermined events occurring in a life of a cardholder, wherein each life stage segment includes cardholders having similar spending behaviors and similar occurrences of the predetermined events;

refine the definitions of the plurality of life stage segments, to increase the distinction between life stage segments, by identifying a high indexing purchase category and a low indexing purchase category for each life stage in an iterative process until a differentiating pattern between a high purchase category index score, associated with the high indexing purchase category, and a low purchase category index score, associated with the low indexing purchase category, is obtained;

define a spending profile for each of the plurality of life stage segments;

select one of the plurality of life stage segments as a life stage target group, the life stage target group including transaction cardholders within at least one of the defined life stage segments for which a marketing campaign is targeted;

develop a survey-based life stage model representing spend behaviors of transaction cardholders within the life stage target group;

create with the processing device, a transaction data-based life stage model by applying the survey-based life stage model to the transaction data stored within the database associated with transaction cardholders within the life stage target group;

store transaction card purchase data from purchases made by transaction cardholders whose life stage segment is unknown;

apply the transaction-based life stage model to the stored transaction card purchase data from purchases made by transaction cardholders whose life stage segment is unknown to identify transaction cardholders included within the life stage target group; and rank the transaction card accounts associated with the transaction cardholders whose life stage segment is unknown based on a likelihood the accounts are included within the life stage target group wherein the ranked transaction card accounts may be used in a marketing campaign.

* * * * *